(12) United States Patent
Hu

(10) Patent No.: US 8,810,898 B2
(45) Date of Patent: Aug. 19, 2014

(54) MICRO-CUP SUBSTRATE PREPARATION METHOD AND DISPLAY DEVICE THEREOF

(75) Inventor: Wang Hu, Beijing (CN)

(73) Assignee: Boe Technology Group Co., Ltd., Beijing (CN)

(*) Notice: Subject to any disclaimer, the term of this patent is extended or adjusted under 35 U.S.C. 154(b) by 74 days.

(21) Appl. No.: 13/481,080

(22) Filed: May 25, 2012

(65) Prior Publication Data

US 2012/0307345 A1 Dec. 6, 2012

(30) Foreign Application Priority Data

Jun. 2, 2011 (CN) .......................... 2011 1 0148327

(51) Int. Cl.
*G02B 26/00* (2006.01)

(52) U.S. Cl.
USPC .......................................................... 359/296

(58) Field of Classification Search
USPC .......................................... 359/90, 291, 296
See application file for complete search history.

(56) References Cited

U.S. PATENT DOCUMENTS

| 2005/0045478 A1 | 3/2005 | Liao et al. |
| 2007/0134852 A1 | 6/2007 | Byun et al. |
| 2011/0244639 A1* | 10/2011 | Ogawa et al. .................. 438/197 |

FOREIGN PATENT DOCUMENTS

| CN | 101441381 A | 5/2009 |
| CN | 101696339 A | 4/2010 |
| TW | 200508763 A | 3/2005 |

OTHER PUBLICATIONS

First Chinese Office Action dated Nov. 18, 2013; Appln. No. 201110148327.
Second Chinese Office Action dated Jun. 26, 2014; Appln. No. 201110148327.X

* cited by examiner

*Primary Examiner* — James Jones
(74) *Attorney, Agent, or Firm* — Ladas & Parry LLP

(57) ABSTRACT

Disclosed in an embodiment of the present disclosure is a preparation method of a micro-cup substrate and a display device thereof, involving the electrophoretic display field, simplifying the process and reducing the cost. The micro-cup substrate preparation method comprises assembling together a bottom substrate and a surface-hydrophilized cover to form a substrate cell; pouring into the substrate cell a solution dissolved with UV-polymerizable monomer(s) and photoinitiator; UV-irradiating the substrate cell through a patterned photomask plate to allow the UV polymerizable monomer(s) in the translucent region to be subject to UV cross-linking polymerization, thereby enabling the bottom substrate to form a micro-cup substrate with a micro-cup structure, and removing the cover and the solvent to obtain the micro-cup substrate.

10 Claims, 1 Drawing Sheet

MICRO-CUP SUBSTRATE PREPARATION METHOD AND DISPLAY DEVICE THEREOF

BACKGROUND

The present disclosure relates to a micro-cup substrate preparation method and a display device thereof.

An electrophoretic display device, also known as electronic paper, is a type of flat panel display equipment, and has the characteristics of both paper and electronic devices. Compared with other display products, an electrophoretic display device has the following advantages: no backlight and polarizer required, dual stability (image can still be retained on the display after the power is turned off), low energy consumption, low cost, good sunlight-readable, thin and light portable, flexible display, less damage to the eyes, compatibility with people's reading habits, and so on. Therefore, the electrophoretic display technology has broad application prospects.

The basic principle of electrophoretic display is that: charged particles with two colors are placed between two electrodes, and a direct-current (DC) voltage applied between the electrodes drives the particles to move towards either of two substrates under the action of electrostatic force and display different colors, thereby the information is recorded and refreshed.

At present, there are three relatively common technologies for preparing the electrophoretic display device, namely: microcapsule electrophoresis way, micro-cup electrophoresis way, and cholesterol liquid crystal way. The principle of a micro-cup electrophoretic display device is that: charged particles are dispersed in a stained insulating material to form a gel electrophoresis solution which is assembled in a special micro-cup, and when an electric field is applied, electrophoresis of the charged particle occurs under the Coulomb force, thereby enabling the directional mobility of the charged particles with a certain color, showing a color dot through a transparent electrode plate. The size of micro-cup and the wall thickness of micro-cup are easy to control, and thus the performances of micro-cup electrophoretic display device such as pressure resistance and solvent resistance can be greatly improved. Micro cup electrophoretic display device is attracting more and more attention due to its unique performances and a more realizable production process.

SUMMARY

One embodiment of the present disclosure is to provide a micro-cup substrate preparation method and a display device, which can simplify the process and reducing production costs.

One embodiment of the present disclosure provides a micro-cup substrate preparation method, comprising: assembling together a bottom substrate and a surface-hydrophilized cover to form a substrate cell; pouring into the substrate cell a solution dissolved with UV-polymerizable monomer(s) and photoinitiator; UV-irradiating the substrate cell through a patterned photomask plate to allow the UV polymerizable monomer(s) in the translucent region to be subject to UV cross-linking polymerization, thereby enabling the bottom substrate to form a micro-cup substrate with a micro-cup structure; and removing the cover and the solvent to obtain the micro-cup substrate.

Another embodiment of the present disclosure provides a display device, including the micro-cup substrate made by the above method.

According to an embodiment of the present disclosure, the UV polymerizable monomer(s) and photoinitiator are dissolved in a solvent and then the solvent is poured into a substrate cell, the process of cross-linking polymerization of the UV polymerizable monomer(s) in the substrate cell is initiated by ultraviolet radiation through a photomask plate to form a polymer with a regular shape for preparing a micro-cup substrate of an electrophoretic display device. Such a preparation method can provide a micro-cup substrate in one step, and thus a greatly simplified process with high production efficiency and low costs; and the polymer materials are generally insoluble and infusible, so the wall of the micro-cup prepared can have good corrosion durability.

Further scope of applicability of the present disclosure will become apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the following detailed description.

BRIEF DESCRIPTION OF THE DRAWINGS

In order to more clearly illustrate embodiments of the present disclosure, a brief introduction is given to the accompanying drawings as required for the description of the present disclosure. It is obvious that the following description of the accompanying drawings only illustrates some embodiments of the present disclosure and the skilled in the art can obtain other drawings from these drawings without any creative work.

DETAILED DESCRIPTION

Figure 1:
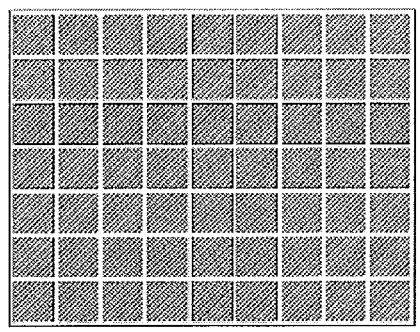
FIG. 1 is a schematic drawing of a photomask plate according to an embodiment of the present disclosure wherein the shading region is square.

The present disclosure will become more easily understood from the detailed description hereinafter of the embodiments with reference to the accompanying drawings which are given only for illustration. It is obvious that the examples illustrated hereinafter are only a part of the examples of the present disclosure, i.e., not all the working examples of the present disclosure are described. Based on the embodiments illustrated herein, those skilled in the art will readily obtain other embodiments without any creative work. Such embodiments should also fall within the protection scope of the present disclosure.

At present, there are two kinds of preparation processes for a micro-cup in an electrophoretic display device. One kind is a high precision mold reel process, and the other kind is a process which uses the printing, exposure, developing, photolithography, and other steps to form a micro-cup substrate. The inventor has found that the above processes face at least the following problems: (i) since the high precision mold reel technology is based on the development of precision molds, the cost is high and the molding process is complicated. If the morphology or size of the micro-cup needs to be changed, precision mold needs re-production which incurs a huge investment in the modification of the line production and process parameters. Furthermore, there are many technical problems to be overcome in the entire process. (ii) The process using the printing, exposure, developing, photolithography, and other steps to prepare a micro-cup substrate is cumbersome and involves many process steps, causing a high cost. In view of the above matters, the inventor has developed a process described in the present disclosure.

Embodiment 1

This embodiment provides a micro-cup substrate preparation method comprising the following steps.

In Step 101, a bottom substrate and a surface-hydrophilized cover (that is, a cover with a hydrophilized surface) are placed opposite to each other for forming a substrate cell.

In this embodiment, the cover, the top substrate and the bottom substrate may be a glass substrate coated with a transparent conductive oxide, such as indium tin oxide (ITO), or a flexible substrate made of PET film for example coated with a transparent conductive oxide, such as ITO.

In order to make the cover hydrophilic so as to peel the cover off without destroying formed polymer micro-cup structure, the cover is subject to a surface treatment. For example, the process involves removal of any residue on the cover surface and the hydrophilic surface treatment.

For example, the removal of any residue on the cover surface includes soaking the cover in a potassium dichromate solution with a concentration of 2.0 wt %-10.0 wt % for 10-20 hours (h) to clean the surface.

One example of hydrophilic surface treatment includes a treatment process as follows: immersing the cover into a siloxane surface treatment solution for 10-30 min followed by washing with deionized water to remove the excess treatment agent from the surface; removing the deionized water on the cover surface by blowing with nitrogen gas ($N_2$) for example; placing the cover in vacuum and heating it to 100-120° C. for 1 h; drying the cover and then letting it cool to the room temperature. After the reaction of the siloxane in the solution with the ITO layer on the cover surface, the siloxane is bonded to the ITO layer on the cover surface such that the cover becomes hydrophilic and repulsive to organic compounds (including organic solvents, polymers, etc.), which can ensure that the polymer micro-cup structure which has been formed within the substrate cell is not destroyed upon peeling off the cover.

In Step 102, a solution dissolved with UV-polymerizable monomer(s) and photoinitiator are poured into the substrate cell.

Pouring into the substrate cell a solution dissolved with UV-polymerizable monomer(s) and photoinitiator can be achieved by a method such as capillarity suction or vacuum injection. For example, the process includes: dissolving UV polymerizable monomer(s) and photoinitiator in a solvent and mixing them uniformly; injecting the mixture into the substrate cell at 20-60° C. for example. The ratio among the UV polymerizable monomers:the photoinitiator:the solvent is equal to 2.0-8.0 wt %:0.1-0.4 wt %:97.9-91.6 wt %.

As shown in Table 1, examples of UV polymerizable monomers include: (a) $C_6M$, (b) $C_6Cl$, (c) 2-phenoxyethyl acrylate, (d) 2-phenoxyethyl methacrylate, (e) n-butyl acrylate, (f) butyl methacrylate, (g) dodecyl acrylate and (h) dodecyl methacrylate, octadecyl acrylate, octadecyl methacrylate, isobornyl acrylate, and isobornyl methacrylate; wherein the photoinitiator is (i) benzoin isopropyl ether or (i) benzophenone, and the solvent is an organic solvent such as tetrahydrofuran, dichloromethane, acetone, and tetrafluoroethylene.

TABLE 1

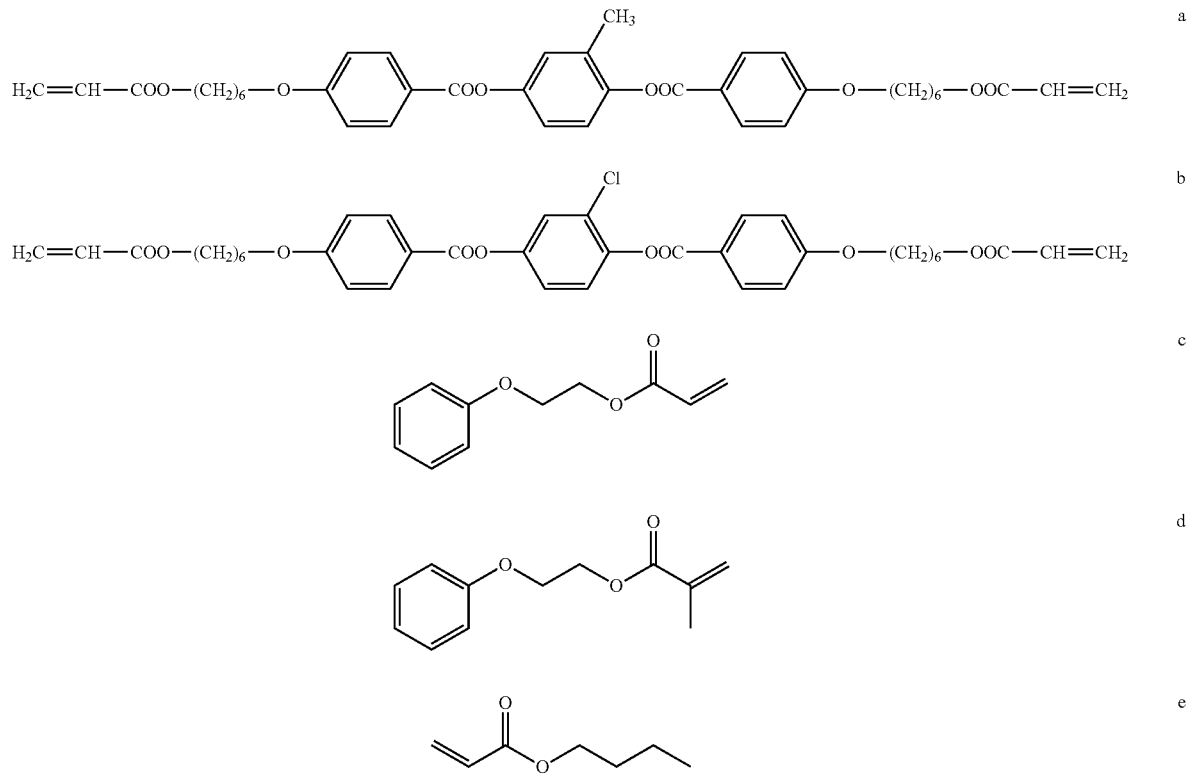

TABLE 1-continued

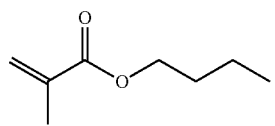 f

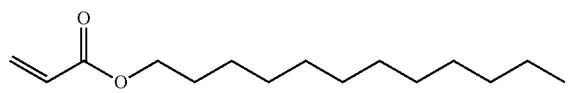 [SMILES: C=CC(=O)OCCCCCCCCCCCC] g

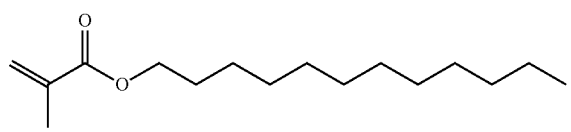 [SMILES: C=C(C)C(=O)OCCCCCCCCCCCC] h

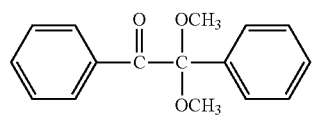 i

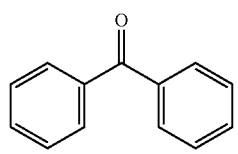 [SMILES: O=C(c1ccccc1)c1ccccc1] j

In Step 103, the substrate cell is irradiated with ultraviolet (UV) light through a patterned photomask plate to allow the UV polymerizable monomer(s) in some translucent region to be subject to UV cross-linking polymerization, thereby enabling the bottom substrate to form a micro-cup substrate with a micro-cup structure.

For example, the patterned photomask plate is placed on the substrate cell with a distance (space) of 3-30 mm between the plate and the substrate cell, and a UV light source is placed above them. The ultraviolet irradiation intensity may be 5.0-60.0 mW/cm$^2$, the UV wavelength is 365.0 nm, and the exposure time of UV irradiation is 1-30 min for example.

UV polymerizable monomer(s) in the substrate cell in the region(s) corresponding to translucent region(s) of the photomask plate is subject to UV cross-linking polymerization, and thus the monomer(s) in the region(s) are consumed at a high speed. Due to concentration difference, small molecules of the monomer(s) in the neighboring region(s) will diffuse and polymerize in the translucent region. By adjusting the concentration of monomer(s) and photoinitiator as well as the size of the photomask plate, a spontaneous polymerization of small molecules of polymerizable monomer(s) may occur substantially in the region(s) corresponding to the translucent region(s) of the photomask plate, thus forming a micro-cup structure.

For example, the geometrical shape of a shading region of the photomask plate may be in a shape of square, round, triangular or multilateral. There is no limitation on the specific shapes in the examples. The translucent region has a certain width, i.e., the wall thickness of the micro-cup substrate prepared, for example in the range of 5-200 μm.

Next, the cover is peeled away from the micro-cup substrate, and the cover is repulsive to organic substances due to the surface hydrophilization. The remaining portion is dried in an oven at 40-90° C. for 2-10 minutes (min) to allow a complete solvent evaporation, thereby obtaining the micro-cup substrate with a regular shape.

Further, if necessary, the residual monomers which do not completely react in the micro-cups are dissolved and washed off with organic solvents, and the solvents are substantially removed to ensure that no unreacted residual monomers are present in the micro-cups. Since the geometrical shape of the photomask plate shading region employed and the width of the translucent region are various, the shape of the micro-cup substrate prepared can be in a shape of square, round, triangular or multilateral. The micro-cup substrate has a cup wall thickness of 5-200 μm for example.

Sequentially, a display medium is added into the micro-cup structure of the micro-cup substrate, and the top substrate and the micro-cup substrate are assembled to obtain an LCD substrate cell.

Further, the drive circuit (driver) may be bonded to the assembled LCD substrate cell, i.e., the micro-cup electronic paper, to complete the manufacturing of the entire display device. Nevertheless, the drive circuit may be provided independently in another example.

Compared with traditional technologies, the embodiment of the disclosure dissolves the UV polymerizable monomer(s) and photoinitiator(s) in a solvent, and the resultant solution is poured into the substrate cell, the process of crosslinking polymerization of the UV polymerizable monomer(s) is initiated inside the substrate cell by UV radiation under the mask of a photomask plate to form a polymer with a regular shape, so as to prepare a micro-cup substrate for an electrophoretic display device. One step is required in this method of the embodiment to prepare a micro-cup substrate. By using a photomask plate with a different shape, a micro-cup substrate with a corresponding shape and size can be prepared. Such a process is much simple, high efficient, and with low cost. Since the polymer materials are generally insoluble and infusible, the wall of micro-cups prepared can have good corrosion durability.

Example 1

This example provides a method for preparing a micro-cup substrate. The steps of the method are performed as follows.

A cover is placed in a potassium dichromate solution having a concentration of 2.0 wt %-10.0 wt % (e.g., 6.0 wt %) to soak for 12 h, and the residual substances on the surface of the cover is completely removed. The cover is then immersed into a siloxane surface treatment solution for 10 min. The redundant treatment agent on the surface is washed off with deionized water, and the deionized water on the surface is removed by blowing with nitrogen gas ($N_2$). The cover is placed in vacuum and heated to 100° C. for 1 h to dry the cover, and then is naturally cooled to the room temperature. The cover and the bottom substrate are assembled with spacers of height of about 10 μm to form a substrate cell. Both the cover and the bottom substrate are a glass substrate coated with an ITO layer.

The surface-hydrophilized cover is repulsive to organic compounds (including organic solvents, polymers, etc.), ensuring that the polymer micro-cup structure formed within the substrate cell will not be destroyed or damaged upon peeling off the cover therefrom.

C6C as UV polymerizable monomer and benzoin isopropyl ether as photoinitiator are dissolved in the solvent acetone (C6Cl:benzoin isopropyl ether:acetone=4.0 wt %:0.1 wt %:95.9 wt %) and mixed uniformly. The resulting solution is leaded or injected into the substrate cell at 45° C. with capillary effect. The photomask plate with the shading region in a square shape as shown in FIG. 1 is placed onto the cover, and the width of the translucent region is 5 μm. A UV light source is placed above them, and the exposure time of UV irradiation is 5 min with a UV irradiation intensity of 30.0 mW/cm$^2$ and a UV wavelength of 365.0 nm.

The UV polymerizable monomers in the substrate cell is subject to UV cross-linking polymerization in the region corresponding to the translucent region of the photomask plate, and thus the monomer in this region is consumed at a high speed. Due to concentration difference, small molecules of the monomer in the neighboring regions may diffuse and be polymerized into a polymer in the translucent region. By adjusting the concentrations of the monomer and the photoinitiator as well as the size of the photomask plate, a substantially complete spontaneous polymerization of small molecules of the polymerizable monomers can occur in the translucent region of the photomask plate, thus forming a micro-cup structure.

Afterwards, the surface-hydropholized cover can be easily peeled off (since the cover is surface-hydropholized, it is "repulsive" to organic compounds). The remaining portion (structure) is dried in an oven at 50° C. for 5 min to allow a substantially complete solvent evaporation. The residual monomers which do not completely react in the micro-cup are dissolved and washed off with an organic solvent, and the solvent is completely removed to ensure that no unreacted residual monomers are present in the micro-cup so as to obtain a micro-cup substrate with a regular shape of square and a cup wall thickness of about 5 μm.

Then a display medium is poured into the micro-cup structure of the micro-cup substrate, and a top substrate and the micro-cup substrate are assembled together to form an LCD substrate cell. Further, a drive circuit is bonded to the assembled LCD substrate cell, i.e., the micro-cup electronic paper, to finish the manufacturing of the display device.

Compared with the conventional technologies, this example of the disclosure dissolves the UV polymerizable monomers and the photoinitiator in a solvent and then pours the solvent into the substrate cell, initiating crosslinking polymerization of the UV polymerizable monomers inside the substrate cell by UV radiation under the mask of a photomask plate to form a polymer with a regular shape for preparing a micro-cup substrate for an electrophoretic display device. One step is required in this method to prepare the micro-cup substrate. By using a photomask plate with a square shape, a micro-cup substrate with corresponding shape and size can be prepared. Such a process is much simple, high efficient, and with low cost. Since the polymer materials are generally insoluble and infusible, the micro-cup wall prepared has good corrosion durability.

Example 2

This example provides a method for preparing a micro-cup substrate. The steps of the method is performed as follows.

A cover is placed in a potassium dichromate solution having a concentration of 2.0 wt %-10.0 wt %, soaking for 15 h to substantially remove the residual substances on the surface of the cover. The cover is then immersed into a siloxane surface treatment solution for 20 min. The redundant treatment agent on the surface is washed off with deionized water, and the deionized water on the surface is removed by blowing with nitrogen gas ($N_2$). Next, the cover is placed in vacuum and heated to 110° C. for 1 h to dry the cover, and then it is naturally cooled to the room temperature. The cover and the bottom substrate are assembled together with an gap of about 60 μm to form a substrate cell. Both the cover and the bottom substrate are an ITO-coated flexible substrate made of PET film.

The surface-hydrophilized cover is repulsive to organic compounds (including organic solvents, polymers, etc.), allowing that the polymer micro-cup structure formed within the substrate cell will not be destroyed upon peeling off the cover.

Figure 2:
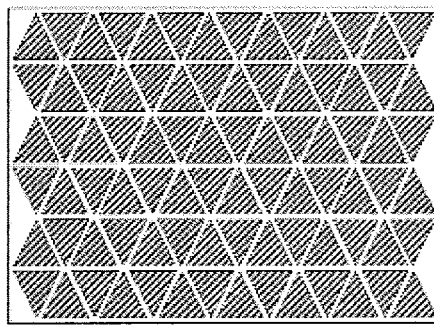
FIG. 2 is a schematic drawing of a photomask plate according to an embodiment of the present disclosure wherein the shading region is triangular.

2-phenoxyethyl acrylate, 2-phenoxyethyl methacrylate, and n-butyl acrylate, which work as UV polymerizable monomers, and benzophenone as photoinitiator are dissolved in the solvent methylene chloride (2-phenoxyethyl acrylate: 2-phenoxyethyl methacrylate:n-butyl acrylate:benzophenone:methylene chloride=2.3 wt %:2.7 wt %:0.6 wt %:0.2 wt %:94.2 wt %) and mixed uniformly. The resulting solution is leaded or injected into the substrate cell at 50° C. under vacuum. The photomask plate with the shading region in a triangular shape as shown in FIG. 2 is placed onto the cover, and the width of the translucent region is about 200 μm. A UV light source is placed above them, and the exposure time of UV irradiation is 4 min with a UV irradiation intensity of 40.0 mW/cm$^2$ and a UV wavelength of 365.0 nm, which made the polymerizable monomers diffuse into the translucent region and then polymerized therein. Afterwards, the surface-hydropholized cover is easily peeled off (since the cover is surface-hydropholized, it is "repulsive" to organic compounds). The remaining portion or structure is dried in an oven at 60° C. for 4 min to allow a substantially complete solvent evaporation. The residual monomers which did not completely react in the micro-cup are dissolved and washed off with an organic solvent, and the solvent is completely removed to ensure that no unreacted residual monomers are present in the micro-cup so as to obtain a micro-cup substrate with a regular shape of triangle and a cup wall thickness of about 200 μm.

Then a display medium is poured into the micro-cup structure of the micro-cup substrate, and the top substrate and the micro-cup substrate are assembled together to foam an LCD substrate cell. A drive circuit is bonded to the assembled LCD substrate cell, i.e., the micro-cup electronic paper, to finish the manufacturing of the entire display device.

Compared with traditional technologies, this example of the disclosure dissolves the UV polymerizable monomers and the photoinitiator in a solvent, and the solvent is next poured into the substrate cell, the process of crosslinking polymerization of the UV polymerizable monomers is initiated inside the substrate cell by UV radiation under the mask of a photomask plate to form a polymer with a regular shape so as to prepare a micro-cup substrate for an electrophoretic display device. One step is required in this method to prepare a micro-cup substrate. By using a photomask plate with a triangular shape, a micro-cup substrate with corresponding shape and size can be prepared. Such a process is much simple, high efficient, and with low cost. Since the polymer materials are generally insoluble and infusible, the micro-cup wall prepared has good corrosion durability.

Example 3

This example provides a method for preparing a micro-cup substrate. The steps of the method are performed as follows.

A cover is placed in a potassium dichromate solution having a concentration of 2.0 wt %-10.0 wt %, soaking for 18 h to substantially completely remove the residual substances on the surface of the cover. The cover is then immersed into a siloxane surface treatment solution for 25 min. The redundant treatment agent on the surface is washed off with deionized water, and the deionized water on the surface is removed by blowing with nitrogen gas ($N_2$). Next, the cover is placed in vacuum and heated to 120° C. for 1 h to dry the cover, and then is naturally cooled to the room temperature. The cover and the bottom substrate are assembled together with an gap of about 50 μm to form a substrate cell. Both the cover and the bottom substrate are an ITO-coated flexible substrate made of PET film.

The surface-hydrophilized cover is repulsive to organic compounds (including organic solvents, polymers, etc.), ensuring that the polymer micro-cup structure formed within the substrate cell will not be destroyed upon peeling off the cover.

Figure 3:
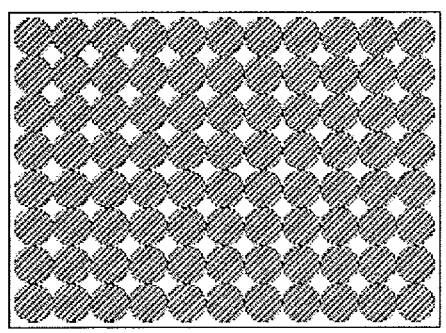
FIG. 3 is a schematic drawing of a photomask plate according to an embodiment of the present disclosure wherein the shading region is circular.

2-phenoxyethyl acrylate, 2-phenoxyethyl methacrylate, and dodecyl methacrylate, which work as UV polymerizable monomers, and benzoin isopropyl ether as photoinitiator are dissolved in the solvent tetrahydrofuran (2-phenoxyethyl acrylate:2-phenoxyethyl methacrylate:dodecyl methacrylate:benzoin isopropyl ether:tetrahydrofuran=2.0 wt %:3.0 wt %:0.5 wt %:0.3 wt %:94.2 wt %) and mixed uniformly. The resulting solution is injected into the flexible substrate cell at 55° C. under vacuum. The photomask plate with the shading region in a circular shape as shown in FIG. 3 is placed onto the cover, the width of the translucent region is about 100 μm. A UV light source is placed above them, and the exposure time of UV irradiation is 3 min with a UV irradiation intensity of 50.0 mW/cm² and a UV wavelength of 365.0 nm, which made the polymerizable monomers diffuse into the translucent region and polymerized therein. Afterwards, the surface-hydropholized cover is easily peeled off (since the cover is surface-hydropholized, it is "repulsive" to organic compounds). The remaining is dried in an oven at 70° C. for 3 min to allow a substantially complete solvent evaporation. The residual monomers which do not completely react in the micro-cup are dissolved and washed off with an organic solvent, and the solvent is completely removed to ensure that no unreacted residual monomers are present in the micro-cup so as to obtain a micro-cup substrate with a regular shape of circle and a cup wall thickness of about 100 μm.

Then a display medium is poured into the micro-cup structure of the micro-cup substrate, and the top substrate and the micro-cup substrate are assembled together to form an LCD substrate cell. A drive circuit is bonded to the assembled LCD substrate cell, i.e., the micro-cup electronic paper to finish the manufacturing of the display device.

Compared with the conventional technologies, this example of the disclosure dissolves the UV polymerizable monomers and the photoinitiator in a solvent, then pouring the solvent into the substrate cell, and initiates crosslinking polymerization of the UV polymerizable monomers inside the substrate cell by UV radiation under the mask of a photomask plate to form a polymer with a regular shape so as to prepare a micro-cup substrate for an electrophoretic display device. One step is required in this method to prepare a micro-cup substrate. By using a photomask plate with a circular shape, a micro-cup substrate with corresponding shape and size can be prepared. Such a process is much simple, high efficient, and with low cost. Since the polymer materials are generally insoluble and infusible, the micro-cup wall prepared has good corrosion durability.

The embodiments of the disclosure being thus described, it will be obvious that the same may be varied in many ways. Such variations are not to be regarded as a departure from the spirit and scope of the disclosure, and all such modifications as would be obvious to those skilled in the art are intended to be included within the scope of the following claims.

What is claimed is:

1. A method for producing a micro-cup substrate, comprising:
   assembling together a bottom substrate and a surface-hydrophilized cover to form a substrate cell;
   pouring into the substrate cell a solution dissolved with UV-polymerizable monomer(s) and photoinitiator;
   UV-irradiating the substrate cell through a patterned photomask plate to allow the UV polymerizable monomer(s) in the translucent region to be subject to UV crosslinking polymerization, thereby enabling the bottom substrate to form a micro-cup substrate with a micro-cup structure; and
   removing the cover and the solvent to obtain the micro-cup substrate.

2. The method according to claim 1, wherein the bottom substrate is a glass substrate or a flexible substrate coated with a transparent conductive oxide.

3. The method according to claim 1, wherein a gap of the substrate cell formed by assembling together the bottom substrate and the surface-hydrophilized cover is set in a range of 10-200 μm.

4. The method according to claim 1, wherein a surface treatment is performed to the cover prior to the assembling together the bottom substrate and the surface-hydrophilized cover to form the substrate cell, which comprises:
   soaking the cover in a potassium dichromate solution at a concentration of 2.0 wt %-10.0 wt % for 10-20 h;
   soaking the cover in a siloxane surface treatment solution for 10-30 min, followed by washing with deionized water to remove the excess treatment agent from the surface;
   removing the deionized water off the cover surface; and
   heating the cover to 100-120° C. under vacuum, drying the cover and then cooling it to the room temperature.

5. The method according to claim 1, wherein pouring into the substrate cell the solution dissolved with UV-polymerizable monomer(s) and photoinitiator comprises:
   dissolving and mixing the UV-polymerizable monomer(s) and the photoinitiator in a solvent to obtain the solution at a ratio of UV polymerizable monomer(s):photoinitiator:solvent=2.0-8.0 wt. %:0.1-0.4 wt %:97.9-91.6 wt %, and pouring the solution into the substrate cell at a temperature of 20-60° C.

6. The method according to claim 1, wherein the UV-irradiating the substrate cell through the patterned photomask plate and removing the cover and the solvent to obtain the micro-cup substrate comprises:
   placing the patterned photomask plate on the substrate cell with a distance of 3-30 mm between the photomask plate and the substrate cell,
   placing a UV light source above the photomask plate and the substrate cell wherein the ultraviolet irradiation intensity is 5.0-60.0 mW/cm$^2$ and the exposure time of UV irradiation is 1-30 min; and
   peeling off the cover, and drying the remaining in an oven at 40-90° C. to allow the solvent evaporate, thereby obtaining the micro-cup substrate.

7. The method according to claim 1, wherein the photoinitiator is benzoin isopropyl ether or benzophenone.

8. The method according to claim 5, wherein the solvent is one or more selected from the group consisting of tetrahydrofuran, methylene chloride, acetone and tetrafluoroethylene.

9. The method according to claim 1, wherein the UV polymerizable monomer(s) is one or more selected from the group consisting of C6M, C6Cl, 2-phenoxyethyl acrylate, 2-phenoxyethyl methacrylate, n-butyl acrylate, butyl methacrylate, dodecyl acrylate and dodecyl methacrylate, octadecyl acrylate, octadecyl methacrylate, isobornyl acrylate, and isobornyl methacrylate.

10. A display device including a micro-cup substrate made according to a method of claim 1.

* * * * *